3,385,703
RECORDING PROCESS
Albert Lucien Poot, Wilrijk-Antwerp, Belgium, assignor to Gevaert Photo-Producten N.V., Mortsel, Belgium, a company of Belgium
No Drawing. Filed June 10, 1965, Ser. No. 463,033
Claims priority, application Great Britain, Dec. 14, 1964, 50,828/64
7 Claims. (Cl. 96—36.3)

The present invention relates to the manufacture of printing elements.

It is an object of the present invention to provide a method and a material for preparing printing plates, the printing surface of which stands in relief, that is, above the surrounding non-printing area.

It is a further object to provide a method and a material for preparing a planographic printing plate, wherein the printing surface is quite on the same level as the plate, but which by a special treatment is hydrophilised in the non-printing areas and made lipophilic in the printing areas to selectively accept a greasy ink.

It is another object of the present invention to provide a method and a material for preparing printing plates the printing design of which is below the surface of the plate.

It is still another object of the present invention to provide a method for preparing a stencil or screen-printing master.

These objects can be accomplished by applying a process comprising the steps of image-wise exposing to U.V.-radiation a recording element applied to a printing base and which contains as U.V.-sensitive compound a 3,5-cyclohexadienone derivative containing in ortho-position to the oxo group at least one acetoxy group or a 2,5-cyclohexadienone derivative containing in para-position to the oxo group at least one acetoxy group and treating the exposed element with water or an aqueous liquid, thereby removing the recording element from the base at the exposed areas.

More particularly said cyclohexadienone derivatives are represented by one of the following general formulae:

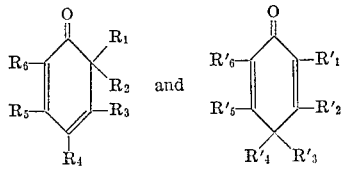

wherein:
$R_1$ represents an acetoxy group,
$R_2$ represents hydrogen, or a hydrocarbon group e.g. alkyl or aryl, an ether group or an acetoxy group,
each of $R_3$, $R_4$, $R_5$ and $R_6$ represents hydrogen, or a hydrocarbon group e.g., alkyl such as methyl, ethyl, n-propyl-, isopropyl, n-butyl, tert. butyl, or isoamyl, an aryl group or substituted aryl group, acetyl or allyl,
where $R_5$ and $R_6$ together may represent the atoms necessary to close an aromatic ring,
$R_2$ and $R_3$ as well as $R_4$ and $R_5$ together may represent the atoms necessary to close a homocyclic saturated ring, and each of $R'_1$, $R'_2$, $R'_4$, $R'_5$, and $R'_6$ represents hydrogen, alkyl, or aryl, and
$R'_3$ represents an acetoxy group.

The cyclohexadienone derivatives being soluble in organic solvents but insoluble or hardly soluble in water can be applied to a suitable base material in the form of solutions in organic solvents that preferably uniformly wet the surface of the base material, and which have a boiling point preferably within the temperature range of 50° to 120° C. The solutions can be used to form a thin uniform layer by a known coating technique, e.g., spraying, kiss-coating, or brushing.

The solvents can be removed from the coated support by evaporation.

It may be advantageous to use a mixture of several cyclohexadienone derivatives in order to preclude any crystallization of the U.V.-sensitive layers. A certain amount of binding agent (e.g., 5 to 20% by weight) such as a resin soluble in an aqueous acid medium, e.g. poly(vinyl pyridine) can improve the mechanical strength. For the purpose of rendering the image areas on the printing plate more visible, dyes can be added to the coating composition.

Metal supports or supports coated with metals like zinc and especially aluminium, are excellently suited to serve as base material for a printing plate. It is not strictly necessary to subject the metal supports to be used to any preliminary chemical treatment in order to render their surfaces apt to accept the light-sensitive layer. A simple mechanical roughening of the metallic surface proves to be quite sufficient for the application of the light-sensitive layer, which firmly attaches itself to the metallic base in the form of a thin uniform film. For the production of planographic printing plates use can be made also of e.g. plates of stone or glass and also of specially treated sheets of paper or plastic foils.

The development or removal of the coating at the exposed areas can be effected by means of water or an aqueous composition, preferably however by means of an alkaline aqueous solution rapidly dissolving the image-wise formed diene acids. After said removal, the un-shielded areas of the base material are preferably treated with an aqueous lithographic solution for hydrophilising or enhancing the hydrophility of the said areas, so as to prepare a planographic printing plate.

For preparing a printing plate, the surface of which stands in relief, a common etching technique is applied after the selective removal of the exposed areas of the U.V.-sensitive layer. Before etching the metal base, however, the remaining areas of the U.V.-sensitive layer can be protected by a lipophilic coating e.g., by applying thereto a lithographic lacquer, which is ink-receptive and acid-resistant, e.g., a lacquer containing a phenolformaldehyde resin.

For preparing a printing plate, the printing design of which is below the surface of the plate, an exposure and etching technique is used whereby in the base material according to a screen pattern cells can be formed for receiving the printing ink.

Base materials that are suitable for etching are well known. More particularly are mentioned base materials, which substantially consist of zinc, copper, steel, or an etchable magnesium alloy.

For preparing a planographic printing plate a base material suitable for lithographic printing, preferably an aluminium sheet is chosen.

In order to increase the hydrophility of the areas of the metal support that are not covered anymore by cyclohexadienone derivatives, an after-treatment may be carried out with the aid of a lithographic preparation that contains at least one compound increasing the ink-repellency of the plate material. Compounds and compositions that are suitable for this purpose are described in the U.S. Ser. No. 846,256.

The ink-receptivity of the hydrophobic unexposed areas can be improved by treating the developed printing plate with a lacquer that adheres to the hydrophobic areas and forms an oleophilic deposit thereon. Suitable lacquers and the method of applying them are described e.g. in the U.S. Ser. No. 114,027 and the U.S. Ser. No. 364,838.

For preparing a stencil-blank or screen-printing master blank, one or both sides of a screening material are coated with an U.V.-sensitive coating as described above. As screening material Japan paper (Yoshino paper), nylon fabrics with a mesh size of 0.2 to 0.08 mm. and woven bronze wire are especially suited.

The stencil or screen-printing master is prepared by washing out the coating corresponding with the U.V.-irradiated areas.

The following formulae, which are referred to in the subsequent examples, represent cyclohexadienone compounds that are preferably used in the present invention.

(1) 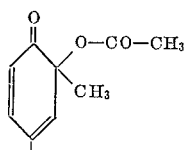

(2) 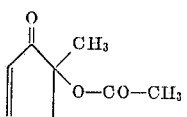

(3) 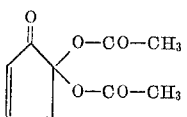

(4) 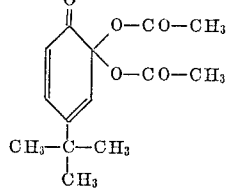

(5) 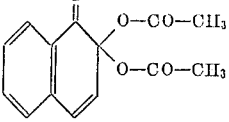

(6) 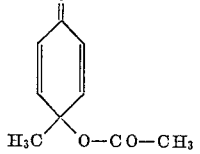

The cyclohexadienone derivatives used in the process of the present invention can be prepared according to known techniques. As an illustration thereof references of the preparation are given hereinafter.

Monatsh. Chemie 81 (1950) 1055–1070; 83 (1952) 902–914, 1253–1273; 84 (1958) 425–441, 655–665, 910–918, 969–991; 85 (1954) 69–79, 637–653; 86 (1955) 292–300, 831–846, 912–923; 87 (1956) 24–26; 88 (1957) 778–792, 1069–1076; 89 (1958) 239–253; 90 (1959) 96–117, 121–133, 609–619, 623–633, 660–668, 713–720, 839–845, 872–876, 877–884; 91 (1960) 92–106, 117–128, 129–138, 280–288, 331–347, 1052–1056, 1144–1149, 1167–1173.

The following examples illustrate the present invention.

EXAMPLE 1

0.5 g. of 2-acetoxy-2,4-dimethyl-3,5-cyclohexadiene-1-one is dissolved in 25 cm.³ of acetone. This solution is coated on a mechanically roughened aluminium foil, so as to obtain a layer of 1μ in thickness after drying at 25° C. in the dark. The obtained U.V.-sensitive material is exposed through a positive line transparency by means of a Philips HP 80 w. mercury vapour bulb placed at a distance of 15 cm.

The development is carried out by wiping the exposed foil with a cotton swab soaked with a 1% aqueous monosodium phosphate solution. Subsequently the foil is rinsed with water and impregnated for 30 seconds with the following lithographic composition:

| | |
|---|---|
| Carboxymethylcellulose _____ g__ | 3.24 |
| Sodium phosphate _____ g__ | 0.6 |
| Phosphoric acid _____ g__ | 0.3 |
| Cetyltrimethylammonium bromide _____ g__ | 0.06 |
| Aqueous formaldehyde (20%) _____ cm.³__ | 1 |
| Water to _____ cm.³__ | 100 |

Next, the image-bearing sheet is rubbed with a lithographic lacquer until the exposed image areas show a uniform tone.

The thus treated plate is ready for use as an offset printing plate.

EXAMPLE 2

Example 1 is repeated but in lieu of 25 ccs. of acetone as the solvent for the indicated amount of cyclohexadienone derivative, 25 cm.³ of ethylene glycol monomethyl ether are used.

EXAMPLE 3

Example 2 is repeated but in lieu of 2-acetoxy-2,4-dimethyl-3,5-cyclohexadiene-1-one an equivalent amount of 2-acetoxy-2-methyl-3,5-cyclohexadiene-1-one is used.

EXAMPLE 4

Example 2 is repeated but in lieu of 2-acetoxy-2,4-dimethyl-3,5-cyclohexadiene-1-one an equivalent amount of 2,2-diacetoxy-4-methyl-3,5-cyclohexadiene-1-one is used.

EXAMPLE 5

Example 2 is repeated but in lieu of 2-acetoxy-2,4-dimethyl-3,5-cyclohexadiene-1-one an equivalent amount of 2,2-diacetoxy-4-tert.butyl-3,5-cyclohexidiene-1-one is used.

EXAMPLE 6

Example 2 is repeated but in lieu of 2-acetoxy-2,4-dimethyl-3,5-cyclohexadiene-1-one an equivalent amount of the compound according to the formula:

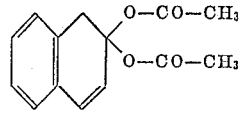

is used.

EXAMPLE 7

Example 2 is repeated but in lieu of 2-acetoxy-2,4-dimethyl-3,5-cyclohexadiene-1-one an equivalent amount of 4-acetoxy-4-methyl-2,5-cyclohexadiene-1-one is used.

EXAMPLE 8

0.5 g. of 2-acetoxy-2,4-dimethyl-3,5-cyclohexadiene-1-one is dissolved in 25 cm.³ of acetone. This solution is coated on a mechanically roughened zinc plate, so as to obtain a layer of 1μ in thickness after drying at 25° C. in the dark. The obtained U.V.-sensitive material is exposed through a positive transparency of a printed text by means of a Philips HP 80 w. mercury vapour bulb placed at a distance of 15 cm. The development is carried out by wiping the exposed foil with a cotton swab soaked with the following solution:

| | Cm.³ |
|---|---|
| Aqueous solution of gum arabic (20%) _____ | 50 |
| Aqueous solution of potassium hexacyanoferrate (III) (10%) _____ | 20 |
| Phosphoric acid _____ | 2 |
| Water to _____ | 100 |

Next, the image-bearing sheet is rubbed with a phenol-formaldehyde lithographic lacquer until the exposed image areas show a uniform tone.

The thus treated plate is transformed into a relief printing master by etching with a suitable etching composition for zinc.

EXAMPLE 9

The U.V-sensitive material of Example 8 is exposed to ultraviolet radiation through a negative half-tone transparency, the screen pattern of which is suited for intaglio printing.

The plate is developed and treated with lacquer as described in Example 8 and is etched with a 15% aqueous nitric acid solution.

After the required depth of the ink cells has been obtained, the organic substrances in the unexposed areas (lacquer and cyclohexadienone compound) are removed so that the plate is ready for printing.

What I claim is:
1. Process for the manufacture of a printing element comprising the steps of image-wise exposing to U.V.-radiation a recording element applied to a printing base and which contains as U.V.-sensitive compound a 3,5-cyclohexadienone derivative containing in ortho-position to the oxo group at least one acetoxy group or a 2,5-cyclohexadienone derivative containing in para-position to the oxo group at least one acetoxy group and treating the exposed element with water or an aqueous liquid thereby removing the recording element from said base at the exposed areas.

2. A process according to claim 1, wherein said cyclohexadienone derivatives correspond to one of the following general formulae:

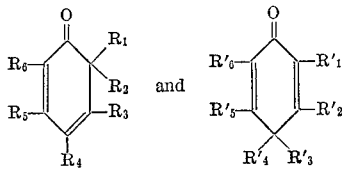

wherein:
$R_1$ represents an acetoxy group,
$R_2$ represents a member selected from the group consisting of hydrogen, a hydrocarbon group, an ether group and an acetoxy group,
each of $R_3$, $R_4$, $R_5$, and $R_6$ represent a member selected from the group consisting of hydrogen and a hydrocarbon group,
each of $R'_1$, $R'_2$, $R'_4$, $R'_5$, and $R'_6$ represents a member selected from the group consisting of hydrogen, an alkyl, and an aryl group,
$R'_3$ represents an acetoxy group, and wherein $R_5$ and $R_6$ may represent the atoms necessary to close an aromatic ring,
$R'_3$ represents an acetoxy group, and wherein $R_5$ and $R_6$ may represent the atoms necessary to close an aromatic ring, and
$R_2$ and $R_3$ as well as $R_4$ and $R_5$ together may represent the atoms necessary to close a homocyclic saturated ring.

3. Process according to claim 1, wherein after the selective removal of the coating in the exposed areas of the U.V.-sensitive layer, the uncovered areas of the base material are treated with a hydrophilising composition, and the remaining areas of the U.V.-sensitive layer are covered with an oleophilic composition.

4. Process according to claim 3, wherein the base material is an aluminium or zinc sheet.

5. Process according to claim 1, wherein after the selective removal of the exposed areas of the U.V.-sensitive coating, the remaining unexposed areas of said coating are protected with an acid-resistant composition, and the base material in the exposed areas is etched.

6. Process according to claim 5, wherein the base material substantially contains zinc, copper, steel, or an etchable magnesium alloy.

7. Process according to claim 1, wherein as base material for the coating a screening material is used and a stencil or screen-printing master is obtained by washing out the coating in the U.V.-irradiated areas.

References Cited

UNITED STATES PATENTS

| 2,908,692 | 10/1959 | Richert | 260—586 X |
| 2,940,853 | 6/1960 | Sagura et al. | 96—33 X |
| 3,091,532 | 5/1963 | Michaelson | 96—115 X |
| 3,173,942 | 3/1965 | Barton et al. | 260—586 X |

NORMAN G. TORCHIN, *Primary Examiner.*
R. E. MARTIN, *Examiner.*